United States Patent [19]

Kimura

[11] Patent Number: 4,794,244

[45] Date of Patent: Dec. 27, 1988

[54] METHOD AND APPARATUS FOR DETECTING FOCUSSING POSITION DEVIATION OF READ/WRITE APPARATUS IN AN OPTICAL RECORDING MEDIUM

[75] Inventor: Fumio Kimura, Tokyo, Japan

[73] Assignee: CSK Corporation, Tokyo, Japan

[21] Appl. No.: 21,665

[22] Filed: Feb. 9, 1987

[30] Foreign Application Priority Data

Feb. 13, 1986 [JP] Japan ............................ 61-029466

[51] Int. Cl.⁴ ............................................. G01J 1/20
[52] U.S. Cl. .................................. 250/201 R; 369/44
[58] Field of Search .................. 250/201 DF, 201 PF; 369/44, 45, 46

[56] References Cited

U.S. PATENT DOCUMENTS

| | | | |
|---|---|---|---|
| 4,045,805 | 10/1977 | Saito | 250/201 PF |
| 4,145,758 | 3/1979 | Drexler et al. | 365/200 |
| 4,152,586 | 5/1979 | Elliott et al. | 250/201 |
| 4,269,917 | 5/1981 | Drexler et al. | 430/16 |
| 4,278,756 | 7/1981 | Bouldin et al. | 430/414 |
| 4,278,758 | 7/1981 | Drexler et al. | 430/616 |
| 4,360,728 | 11/1982 | Drexler | 235/462 |
| 4,382,665 | 5/1983 | Eguchi et al. | 250/201 PF |
| 4,470,676 | 9/1984 | Kinoshita et al. | 250/201 PF |
| 4,500,777 | 2/1985 | Drexler | 235/487 |
| 4,542,288 | 9/1985 | Drexler | 235/487 |
| 4,544,835 | 10/1985 | Drexler | 235/487 |
| 4,559,446 | 12/1985 | Suzuki | 250/201 PF |
| 4,634,851 | 1/1987 | Ogasawara et al. | 250/201 PF |
| 4,701,603 | 10/1987 | Dakin et al. | 250/201 DF |

FOREIGN PATENT DOCUMENTS 0083838 7/1983 European Pat. Off. .

Primary Examiner—David C. Nelms
Assistant Examiner—William L. Oen
Attorney, Agent, or Firm—Lowe, Price, LeBlanc, Becker & Shur

[57] ABSTRACT

A method and apparatus for detecting a focussing position wherein a difference between photoelectric outputs from two photodetectors is amplified by a differential amplifier to detect a deviation of a focal point of a reader/writer head in the reading/writing operation for an optical recording medium.

Prior to the amplification of the difference between the photoelectric outputs from the photodetectors, the output voltage from one of the photodetectors is changed to be input to the differential amplifier and the changing ratio is set so that the output from the differential amplifier will be zero when focalized.

For this purpose, a voltage changing device for changing the photoelectric output from the photodetector is provided between an output of the photodetector and an input of the differential amplifier.

9 Claims, 2 Drawing Sheets

METHOD AND APPARATUS FOR DETECTING FOCUSSING POSITION DEVIATION OF READ/WRITE APPARATUS IN AN OPTICAL RECORDING MEDIUM

FIELD OF THE INVENTION

This invention relates to a method and apparatus for detecting a focussing position, in which a difference between photoelectric outputs from two photodetectors is amplified by a differential amplifier to detect a deviation from the focal position of reader/writer head in the reading/writing operation for an optical recording medium.

BACKGROUND OF THE INVENTION

In general, it is essential in the writing of data into an optical recording medium such as a compact disc or the like, or in the reading of the data written therein, that the focal position of the reader/writer head is appropriately and accurately on a data record surface of the optical recording medium. For this purpose, a possible deviation between the focal position of the reader/writer head and the data record surface of the optical recording medium is detected and the position of an optical system, such as a lens, is adjusted in the optical axis direction by an actuator by a distance corresponding to the deviation, to change the focal length of the optical system, so as to automatically attain the desired focalization.

A possible relative deviation of the focal position of the reader/writer head from the data record surface of the optical recording medium may be detected, for example, by the astigmatism method, the critical-angle method or the knife-edge method. The relative deviation of the optical recording medium from the focal position of the reader/writer head is detected as a deviation output after the photoelectric outputs from the photodetectors for detecting the focal position have been processed according to any of the methods as mentioned above. The relationship between the deviation of the optical recording medium from the forcal position and the deviation output based thereon is represented by an S curve in FIG. 2. In FIG. 2, a portion 1 around a zero-crossing point represents a focussed or focalized position. Whereas, portions 2 and 3 represent deviation outputs when the focus of the reader/writer head is deviated from the position to be focused or focalized.

The reading/writing operation is carried out at the position 1 of the above-mentioned S curve. When the reader/writer head is out of the position 1, a feedback control is applied to an actuator for moving a lens so that the outputs from the photodetectors may always be kept zero. Thus, the focal point of the reader/writer head is automatically maintained on the position of the data record surface of the optical recording medium to be focussed or focalized. This enables a stable read/write operation.

The conventional focussing position detecting methods as described above, however, involve the following problems.

The deviation output should ideally be zero, at the focussed or focalized position of the chrracteristic S curve a shown in FIG. 2, after the photoelectric outputs from the photodetectors have been processed. In effect, however, the deviation output will not be zero. More particularly, there is generally some offset in the differential amplifier due to possible variations in characteristics between the photodetectors and possible inaccuracy in the mounting positions of the photodetectors. Due to this offset in the differential amplifier, some voltage is always output. To solve this problem, the automatic focussing control is carried out, heretofore, based on a detection signal which contains this voltage output due to the offset.

In this connection, however, it is to be noted that when an output from a light source is increased, the outputs from the two photodetectors will increase proportionally at a fixed rate, but the difference between the two outputs will not increase at a fixed rate. Therefore, when it is required to increase the output from the light source, for example, for carrying out the writing operation, the amplitude of the S curve is amplified as shown in FIG. 3. As a result of this, if there is an offset in the differential amplifier, the output at the focussed position (see 1 of FIG. 3) can not be zero. The amplitude of this output is also amplified, also amplifying the difference. The so amplified difference is then output to the actuator to operate the same to change its position inaccurately or wrongly to an extent not allowable, even when the lens of the optical system is at an appropriate position capable of attaining the focussing.

Thus, the conventional focussing position detection methods have such a problem that misoperation is possibly caused and accurate focussing is not assured when the utput from the light source varies or is varied.

SUMMARY OF THE INVENTION

The present invention has been made to obviate the problems involved in the conventional methods, and it is therefore an object of the present invention to provide a method and apparatus for detecting a focussing position which is capable of accurately detecting a deviation from a position to be focussed or focalized, irrespective of a possible offset of a differential amplifier, is free from possible misoperation and is capable of attaining accurate automatic focussing control.

The present invention features a method for detecting a focussing position in which photoelectric outputs from two photodetectors are processed by a differential amplifier to detect a relative deviation of a focal position of a reader/writer head from an optical recording medium, which method comprises a step, for the amplification of the difference between the outputs from the two photodetectors, to vary or change the photoelectric output from one of the photodetectors to be input to the differential amplifier, the ratio of the change being selected so that an output from the differential amplifier will be zero at the focussed position.

The present invention further features an apparatus for detecting a focussing position which comprises a voltage varying or changing means for varying or changing a photoelectric output from a photodetector. This voltage changing means is connected between an output of the photodetector and an input of the differential amplifier. The ratio of the change of the voltage is set so that the output from the differential amplifier will be zero at the focussed position.

The change of the photoelectric output from the photodetector is carried out by dividing or boosting. The ratio of the change is determined based on an actually measured focussing position.

(Operation)

In general, if an input voltage at a non-inverse input terminal of the differential amplifier is assumed as $v_1$ and an input voltage at an inverse input terminal of the amplifier is assumed as $v_2$, an output voltage $e_o$ will be given by $$e_o = A(v_1 - v_2)$$

where A is an amplification degree.

According to the present invention, an output voltage $e_1$ of one of the two photodetectors for detecting a focussing position is input to one of the input terminals of the differential amplifier having the characteristics as described above, and an output voltage $e_2$ of another of the two photodetectors is nnput to another input terminal after varied with a ratio s of the change. The output voltage $e_o$ of the differential amplifier will be $$e_o = A(se_2 - e_1)$$

where A is an amplification degree.

The ratio s of the change is selected so that the output voltage $e_o$ of the differential amplifier will be zero when focalized. When the ratio is so selected, there is a relation $s = e_1/e_2$. If the ratio of the output signals $e_1$ and $_2$ of the two photodetectors is fixed, the output voltage of the differential amplifier will be zero, irrespective of the magnitude of the difference. Therefore, even if the output from the light source is changed, the focussing position can be detected with accuracy, irrespective of the influence by a possible offset, so long as the ratio between the output signals $e_1$ and $e_2$ from the two photodetectors is fixed.

As described above, the present invention enables accurate detection of a deviation from the focussing position even when the light source output is varied, irrespective of the influence by the offset of the differential amplifier and enables accurate automatic focussing control without possible misoperation.

PREFERRED EMBODIMENTS OF THE INVENTION

Figure 1:
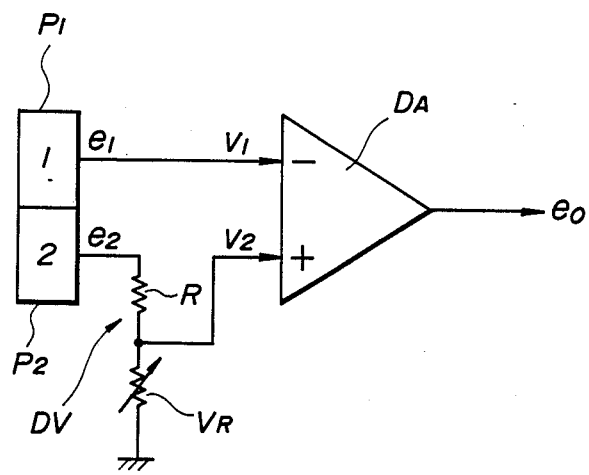
FIG. 1 is a circuit diagram of one mode of a focussing position detecting system embodying the present invention.
Figure 2:
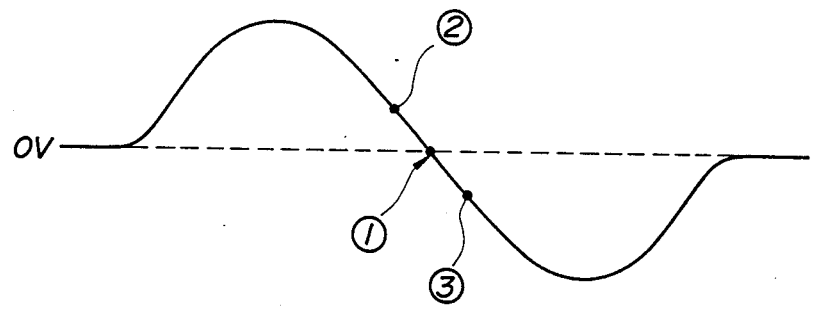
FIG. 2 is a waveform diagram showing a change in outputs from focussing position detecting photodetectors due to a deviation from the foccusing position, which outputs are obtained after processed by any conventional method.
Figure 3:
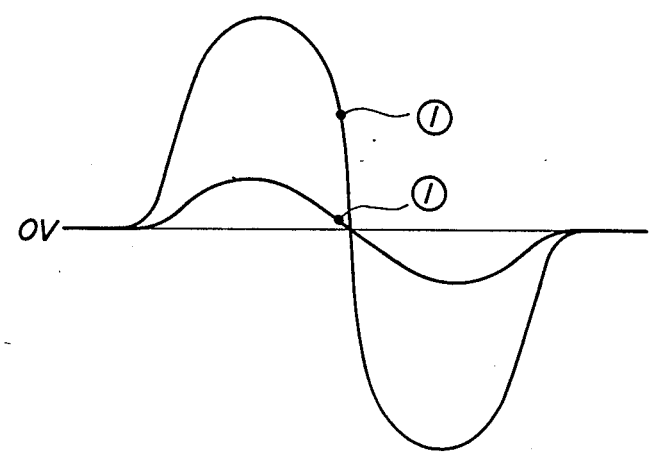
FIG. 3 is a waveform diagram showing an influence by an offset when an output from a light source is increased.

Preferred embodiments of the present invention will now be described referring to the drawings.

(Construction of an Embodiment)

FIG. 1 illustrates one mode of a focussing position detecting method according to the present invention and an apparatus for carrying out the method.

The circuit arrangement as illustrated in FIG. 1 is suited for carrying out the present invention according to the critical-angle method. This circuit comprises two photodetectors $P_1$ and $P_2$ for detecting a focussing position, a differential amplifier DA for amplifying a difference between the photoelectric outputs from the respective photodetectors $P_1$ and $P_2$ and a voltage divider DV as a voltage changing means, which is connected between the photodetector $P_2$ and a non-inverse input terminal of the differential amplifier DA.

The differential amplifier DA is formed, for example, of an operational amplifier. If the two input voltages are assumed as $v_1$ and $P_2$, respectively, and the amplification degree is assumed as A, the output voltage of the amplifier will be:

$$e_o = A(P_2 - P_1)$$

The voltage divider DV is the voltage changing means, i.e., means for changing the output from the photodetector $P_2$ and it may be provided in any of various forms. In the present embodiment, the voltage divider DV is formed of a series arrangement of a fixed resistor R and a variable resistor VR. The so formed voltage divider DV is connected to an output terminal of the photodetector $P_2$ and a ground. The junction point between the fixed resistor R and the variable resistor VR is connected to a non-inverse input terminal of the differential amplifier DA. The voltage dividing ratio of the voltage divider DV may be varied by the variable resistor.

(Operation of the Embodiment)

With the arrangement as described above, the voltage dividing raiio s is first set so that the output voltage $e_o$ from the differential amplifier DA will be zero when focalized, to detect a focussing position. More particularly, the resistance value of the variable resistor VR in the voltage divider DV is varied to set the voltage dividing ratio.

In this connection, it is now assumed that the focal point is adjusted, and the resistance value of the variable resistor VR is varied so that the output voltage $e_o$ from the differential amplifier DA will be zero and the output voltage $e_o$ will be zero when the resistance value is set to be $R_2$. At this time, the voltage dividing ratio s will be given by $$s = R_2/(R_2 + R_1)$$

where $R_1$ is a resistance value of the resistor R.

Thus, when an output voltage $e_1$ from one of the two photodetectors for detecting a focussing position is input to one of the input terminals of the differential amplifier as described above and an output voltage from another photodetector is input to the other input terminal of the amplifier after divided at the voltage dividing ratio s, the output voltage $e_o$ of the differential amplifier will given by $$e_o = A(R_2 e_2(R_2 + R_1) - e_1)$$

where A is an amplification degree.

Under this condition, if the ratio between the output voltages $e_1$ and $e_2$ of the two photodetectors for detecting a focussing position is $$e_1/e_2 = R_2(R_2 + /R_1)$$

$e_o$ will always be zero and it can be determined that the focal point of the reader/writer head is just on an appropriate position on a data record surface of an optical recording medium. If $e_0$ is not zero, it can be known, from the polarity, which direction, either forward or rearward, the focussing position is deviated in. Therefore, in the writing of the data, the detection of the focussing position can be free from the influence by the offset of the differential amplifier even when the light source output is increased, so long as the ratio between the output voltages $e_1$ and $e_2$ from the two photodetectors for detecting the focussing position is kept fixed in the relation as described above.

(Modifications of the Embodiments)

The voltage divider employable in the foregoing embodiment is not limited to that as specified above and it may be any circuit which can divide an output voltage from the photodetector at a predetermined voltage dividing ratio.

Although the voltage divider is employed as a circuit for varying the output voltage from the photodetector in the foregoing embodiment, a boosting voltage may alternatively be employed when the output is smaller than that of the other photodetector.

What is claimed is:

1. In a method for detecting a focussing position when reading and writing operations with respect to an optical recording medium are carried out with a light source providing a light output which varies in intensity when a writing operation takes place, wherein a difference between photoelectric outputs from two photodetectors is amplified by a differential amplifier to detect a deviation of a focal point of a read-write head in the reading/writing operation for an optical recording medium, the improvement comprising:
   prior to the amplification of the difference between the photoelectric outputs from the photodetectors, changing the output voltage from one of the photodetectors input to the differential amplifier by a ratio set so that the output from the differential amplifier will be zero when focalized.

2. A method according to claim 1, in which the photoelectric outputs from the photodetectors are changed by voltage division.

3. A method according to claim 1, in which the photoelectric outputs from the photodetectors are changed by boosting.

4. In an apparatus for detecting a focussing position when reading and writing operations with respect to an optical recording medium are carried out with a light source providing a light output which varies in intensity when a writing operating takes place, which includes two photodetectors and a differential amplifier for amplifying a difference between the photoelectric outputs from the photodetectors and which detects a deviation of a focal point of a read-write head in the reading/writing operation for an optical recording medium, the improvement comprising:
   a voltage changing means for changing the photoelectric output from one photodetector;
   said voltage changing means being connected between an output of the photodetector and an input of the differential amplifier;
   said voltage changing means having a voltage changing ratio selected so that the output from the differential amplifier will be zero when focalized.

5. An apparatus according to claim 4, in which said voltage changing means is a voltage divider.

6. An apparatus according to claim 5, in which said voltage changing means is a booster.

7. In a focussing device for detecting focal position of an optical read-write head, said read-write head producing an output beam having a first output intensity for optically writing information on a medium and having a second output intensity for reading information from the medium wherein said second output intensity is significantly lower than said first output intensity, said focussing device including first and second photodetectors each providing a photoelectric output signal and a differential amplifier receiving said output signals from said photodetectors and operable for outputting an amplified difference between the output signals of the two photodetectors, the improvement comprising:
   correcting means for maintaining constant the output signal of said differential amplifier when the beam from said read-write head is focussed on the medium and the intensity thereof varies between said first and second output intensities,
   said correcting means comprising means for maintaining fixed a ratio of the input signals to said differential amplifier.

8. An improved focussing device as recited in claim 7 wherein said correcting means comprises multiplying means for multiplying an output of one of said photodetector by a compensating constant prior to input to said differential amplifier means, thereby maintaining constant the ratio of signals input to said differential amplifier from said photodetectors when the output intensity changes for the output beam of said read-write head.

9. An improved focussing device as recited in claim 8 wherein said multiplying means comprises voltage dividing means.

* * * * *